Figure 1:
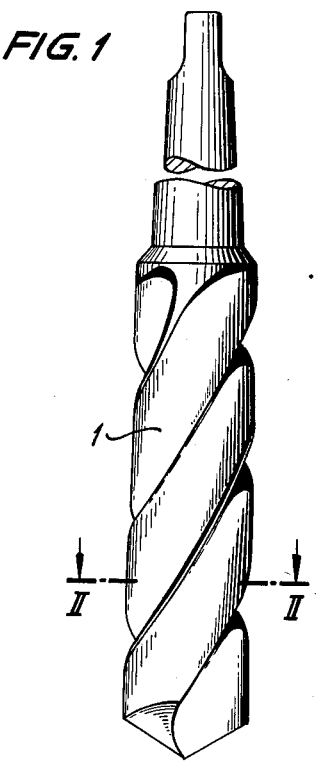

May 14, 1963    G. CLAAS ETAL    3,089,354

METHOD FOR THE PRODUCTION OF CUTTING TOOLS

Filed Oct. 28, 1960

INVENTORS
Günther Claas
Erich Schewe

BY
Michael S. Striker
Attorney

United States Patent Office 3,089,354
Patented May 14, 1963

3,089,354
METHOD FOR THE PRODUCTION OF CUTTING TOOLS
Gunther Claas and Erich Schewe, Remscheid-Vieringhausen, Germany, assignors to Deutsche Spiralbohrer- und Werkzeugfabriken G.m.b.H., Remscheid-Vieringhausen, Germany, a firm
Filed Oct. 28, 1960, Ser. No. 65,785
Claims priority, application Germany Oct. 30, 1959
1 Claim. (Cl. 76—108)

This invention relates to a method of producing cutting tools having a body presenting rotation symmetry, particularly twist drills.

Tools of this kind are generally made of hardened steel. Moreover, they are usually case-hardened, for instance by nitriding, in order to reduce wear on the guide surfaces and hence to improve the ability of the tool to retain its dimensional accuracy even after prolonged use.

Heretofore, tools of this kind have been subjected to the case-hardening process after they have been machined to their final shape, the case-hardening process affecting the entire surface of the finished tool. In the practical use of twist drills or the like which have been treated in this way, it has been found that especially tools of smaller diameter tend to fracture more easily than tools of the same size which have not been case-hardened, for instance by nitriding. This is due to the fact that, in the production of a very hard surface by nitriding, the sharp edges of the tool where portions of the surface meet from several sides are subjected to a certain amount of embrittlement. In twist drills, this undesirable effect is particularly noticeable at the lips of the tool, which are formed by flutes and margins, and on the surface of the lands of the tool. Owing to the great hardness of these surface areas, torsional vibrations and the like during use frequently give rise to fine fissuration which eventually leads to a fracture.

A known method of producing twist drills consists in grinding the required contours such as flutes and the like into hardened, solid cylindrical blanks which have unbroken external surfaces and the diameters of which correspond to the full diameters of the tools to be made, so that no further thermal treatment after machining is needed. Any wear-reducing protective surfaces, such as nitride cases, such tools are required to possess are not formed on the tool until it is finish machined. These tools therefore suffer from the above-mentioned defects.

The object envisaged by the present invention is to provide a method of producing a cutting tool of the aforedescribed kind whereby maximum resistance to wear is imparted to the exposed surfaces of the tool without at the same time increasing the liability of the tool to fracture.

To achieve this object, the method according to the invention comprises the steps of machining a blank to the full external diameter of the finished tool, surface hardening said machined blank by subjecting it to a hardening treatment, and finishing said surface-hardened blank by machining flutes and lands into the same in such a manner that the hardened surface remains only on the guide margins of the completed tool.

An important feature of the invention consists in that the blank may consist of a hardened high-speed steel.

According to another feature of the invention the surface hardening of the machined blank may be effected by nitriding.

According to still another feature the machining of the flutes and lands into the surface-hardened blank may be effected by grinding.

In this procedure the specially hard protective surface will remain only on the guide margins of the tool, whereas it will be removed from all other regions by the operation of machining the necessary recesses, such as flutes and the like, into the case-hardened blank. The resultant tool therefore exhibits no greater tendency to fracture than a tool which has not been case-hardened but the advantages, such as high resistance to wear, afforded by the presence of the specially hard protective surface layer on the margins of the tool are nevertheless fully retained.

The method according to the invention does not in practice raise the cost of production, because no additional operations are needed. In actual fact, the surface area which must be case-hardened is smaller than heretofore.

Figure 2:
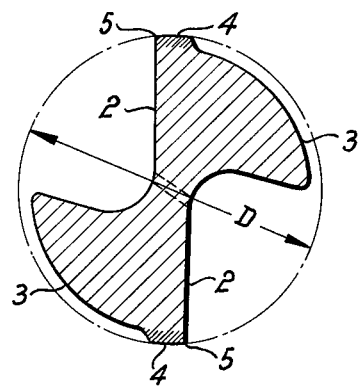

A preferred embodiment of a twist drill produced in accordance with the invention will now be described by way of example and with reference to the accompanying drawing, in which:

FIG. 1 is a side view of a twist drill, and
FIG. 2 is a cross section, on a larger scale, through the twist drill taken on the line II—II in FIG. 1.

For producing a twist drill 1 shown in the drawing, use is made of a hardened, solid cylindrical high-speed steel blank which is ground to the full diameter D of the required twist drill. This blank is then provided with a thin, specially hard, wear-resistant protective surface by nitriding or similarly treating its entire surface. Thereafter flutes 2 and lands 3 are ground into the case-hardened blank, so that the case-hardened surface will remain only on guide margins 4 of the tool defined by the flutes 2 and the lands 3. At lips 5 of the tool which are formed by the flutes 2 and the guide margins 4, this method of production limits the case-hardened surface to the region of the guide margins, so that the lips 5 are not subjected to the risk of embrittlement which might adversely affect the life of the tool. On the other hand, the case-hardened protective surface provides a reliable non-wearing surface of the guide margins.

Of course, various changes may be made in the details disclosed in the foregoing specification without departing from the invention and the claims annexed hereto. For instance, the invention could be applied to cutting tools of types other than that shown in the drawing. The method would also be applicable to subland drills, taps, reamers, shank-type cutters, and so forth.

We claim:

A method of producing a cutting tool having a body presenting rotation symmetry, particularly a twist drill, comprising the steps of machining a hardened steel blank to the full external diameter of the finished tool; casehardening said hardened steel blank to further harden only the surface region of said hardened steel blank and thus provide an especially hard protective surface layer on said hardened steel blank; and finishing said hardened steel blank after said casehardening thereof my machining flutes and lands into the same in such a manner that said especially hard protective surface layer remains only on the lands of the completed tool.

References Cited in the file of this patent
UNITED STATES PATENTS

| | | |
|---|---|---|
| 1,473,086 | Davidson | Nov. 6, 1923 |
| 1,895,439 | Aubert et al. | Jan. 31, 1933 |
| 2,917,952 | Lavallee | Dec. 22, 1959 |